Dec. 9, 1958   C. R. NULL   2,863,703
AUXILIARY WHEEL
Filed July 31, 1957
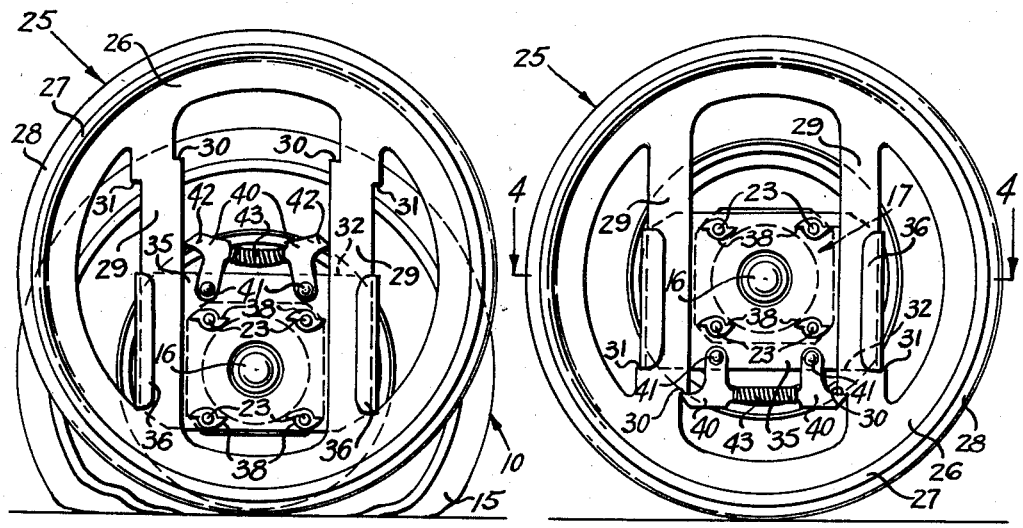
*FIG. 1*   *FIG. 2*
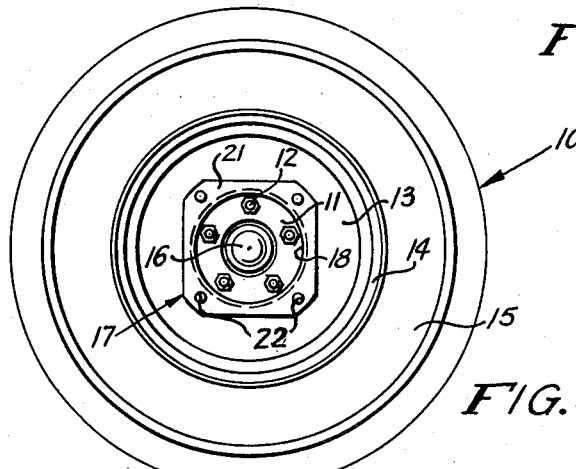
*FIG. 3*
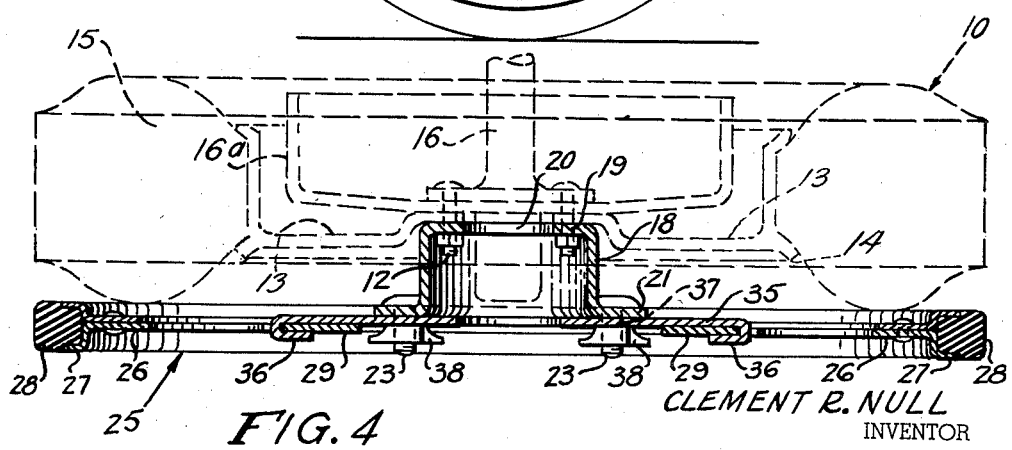
*FIG. 4*
CLEMENT R. NULL
INVENTOR
BY
ATTORNEYS.

United States Patent Office 2,863,703
Patented Dec. 9, 1958

2,863,703

AUXILIARY WHEEL

Clement R. Null, Olney, Ill.

Application July 31, 1957, Serial No. 675,327

2 Claims. (Cl. 301—38)

This invention relates to an auxiliary wheel, and more particularly to an auxiliary wheel or attachment for pneumatic-tired vehicles adapted to be applied to a wheel in the event of a flat tire, so that the vehicle may be driven to a service station or the like for repair of the tire, without damaging the tire, thus precluding the necessity of changing a tire on the road.

A primary object of the invention is the provision of such an auxiliary wheel which may be readily attached to or detached from a regular wheel of the vehicle in the event of a flat tire with a minimum of effort and difficulty, and which, when applied will serve to support the vehicle without subjecting the flat tire to pressure of the vehicle body when driven.

An additional very important object of this invention is the provision of such an auxiliary wheel which is substantially self-applying, thus obviating the necessity for the jacking up of the vehicle to position the auxiliary wheel in operative or supporting position.

A further important object of the invention is the provision of such a wheel which may be attached and applied with a minimum of time, effort and difficulty.

Still other objects reside in the combinations of elements, arrangements of parts, and features of construction, all as will be more fully pointed out hereinafter and disclosed in the accompanying drawing, wherein there is shown a preferred embodiment of this inventive concept.

A further object is the provision of such a device which will be sturdy and durable in construction, reliable and efficient in operation and relatively inexpensive and simple to manufacture, assemble and utilize.

Other objects in part will be obvious and in part be pointed out hereinafter and shown in the drawing.

In the drawing:

Figure 1 is a side elevational view of the auxiliary wheel of the instant invention shown as originally applied to a conventional vehicle wheel having a flat tire.

Figure 2 is a view similar to Figure 1 but showing the auxiliary wheel in operative position.

Figure 3 is a side elevational view of the vehicle wheel, with the auxiliary wheel removed, and the hub cap removed showing the interior attaching means for the auxiliary wheel, and Figure 4 is an enlarged sectional view taken substantially along the line 4—4 of Figure 2 as viewed in the direction indicated by the arrows.

Similar reference characters refer to similar parts throughout the several views of the drawing.

Having reference now to the drawing in detail, there is generally indicated at 10 a vehicle wheel, comprised of a hub 11, which includes the conventional attaching bolts 12 for securing the wheel thereto, the wheel including a disc 13, a rim 14, and a tire 15 mounted on the rim. The wheel is adapted to be mounted on a conventional axle 16, surrounded by a brake drum 16a (see Fig. 3), and the usual securing bolts 12 serve to hold the wheel assembly in position on the axle 16. In Figure 2 the wheel is shown with the conventional hub cap omitted, and the attaching cup for the auxiliary wheel of the instant invention is generally indicated at 17. This includes a cup shaped member 18, provided with apertures 19, for the reception of the wheel engaging bolts 12, and a central aperture 20 through which the end of the axle 16 is adapted to be passed. The cup shaped member 17 is circular in configuration, and at its outer face is provided with an outwardly flared rectangular flange 21 having bolt openings 22 in the corners thereof, within which are adapted normally to be secured bolts 23.

In the normal use of the car, the entire unit 17 is carried by the wheel, at all times, and is covered by the conventional hub cap, not shown. The auxiliary wheel of the instant invention is generally indicated at 25, and includes a relatively narrow circular flange 26, having riveted thereto a bifurcated rim assembly 27 which carries a relatively narrow hard rubber auxiliary tire 28.

Extending transversely across the interior periphery of the flange 26 are a pair of spaced apart parallel struts or bars 29, provided at a point adjacent one end with confronting internal shoulders 30, and positioned slightly above which are a pair of oppositely disposed outer shoulders 31, the shoulders 30 being on the inner sides of the bars, and the shoulders 31 being on the outer side.

A flat plate 35 having inwardly reverted ends 36 is slidably mounted on the bars 29. The plate 35 includes spaced apertures 37, through which are adapted to be projected the bolts 23, wing nuts 38 being employed fixedly to secure the plate to the member 17, the plate 35 being thus fixedly secured co-axial with the axle 16, and the rim 27 and its associated tire 28 being free to move vertically by virtue of the slidable mounting thereof on the members 29. One edge of the plate 35 has secured thereto between the members 29 a pair of spaced apart dogs 40, the dogs 40 being pivoted to the plate 35 as by means of pivots 41. Each dog 40 includes a tooth 42, which is adapted to ride along the inner face of members 29, until engaged by the notches 30. The dogs are biased outwardly as by means of a spring 43.

In the use and operation of the device the hub cap of the wheel is first removed when the flat tire occurs, and the auxiliary wheel and tire is fixedly secured to the bolts 23 by means of the wing nuts 38, with the struts or bars 29 in vertical position, with the notches 30 and 31 being uppermost. The car is then moved so that the wheel is rotated a half turn, at which time the weight of the car forces the plate 35 downwardly to the position shown in Figure 2. At this time the dogs 40 engage the shoulders 30, while the shoulders 31 by their engagement with the reverted ends 36 of plate 35 preclude further downward movement of the plate 35. The flattened tire is thus raised completely from the surface of the ground, and the weight of that portion of the vehicle formerly supported by this wheel is fully carried by the auxiliary wheel 25 on its tire 28. Obviously the car may now be driven, with the dogs 40 firmly engaged against shoulders 30 so that when the position of the wheel is again reversed its return to the original starting position is precluded. When a service station or the like is reached, the entire assembly may be readily removed by removal of the wing nuts 38, and the tire and wheel replaced in the conventional manner.

From the foregoing it will now be seen that there is herein provided an improved auxiliary wheel of this character, which accomplishes all of the objects of this invention, and others, including many advantages of great practical utility and commercial importance.

As many embodiments may be made of this inventive concept, and as many modifications may be made in the embodiment hereinbefore shown and set forth, it is to be understood that all matter herein is to be interpreted merely as illustrative and not in a limiting sense.

I claim:

1. In an auxiliary wheel for a pneumatic tired vehicle, a fastening member secured to a wheel of a vehicle and concentric with the axle thereof, an auxiliary wheel of substantially the same diameter as said vehicle wheel, said auxiliary wheel including a tire, a flanged rim and a pair of spaced parallel flat struts extending transversely across said rim, a plate having reverted end flanges extending around the outer sides of said struts slidably mounted on said struts, means securing said plate to said fastening member, shoulders formed on the outer sides of said struts engaging said vertical end flanges for limiting the movement of said slidable plate in one direction, shoulders formed on the inner opposed surfaces of said struts, and dogs pivoted on said plate engageable with said last mentioned shoulders for releasably locking said slidable plate against movement in the other direction.

2. The structure of claim 1 wherein said dogs are spring biased toward engagement with their associated shoulders.

References Cited in the file of this patent

UNITED STATES PATENTS

| 2,220,518 | Grasso | Nov. 5, 1940 |
| 2,707,659 | Sloyan | May 3, 1955 |